(12) United States Patent
Tsukioka

(10) Patent No.: US 12,515,617 B2
(45) Date of Patent: Jan. 6, 2026

(54) MOBILE BODY CONTROL DEVICE, MOBILE BODY CONTROL METHOD, AND RECORDING MEDIUM

(71) Applicant: HONDA MOTOR CO., LTD., Tokyo (JP)

(72) Inventor: Masataka Tsukioka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 18/440,008

(22) Filed: Feb. 13, 2024

(65) Prior Publication Data

US 2024/0300445 A1 Sep. 12, 2024

(30) Foreign Application Priority Data

Mar. 7, 2023 (JP) .................................. 2023-034488

(51) Int. Cl.
*B60R 25/24* (2013.01)
*G07C 9/00* (2020.01)

(52) U.S. Cl.
CPC ........ *B60R 25/245* (2013.01); *G07C 9/00309* (2013.01); *B60R 2325/101* (2013.01); *B60R 2325/205* (2013.01); *G07C 2009/00793* (2013.01); *G07C 2209/63* (2013.01)

(58) Field of Classification Search
CPC ............ B60R 25/245; B60R 2325/101; B60R 2325/205; B60R 25/24; G07C 9/00309; G07C 2009/00793; G07C 2209/63; Y02D 30/70; H04W 24/08; H04W 52/0209; H04W 52/0212

USPC .................................................. 340/5.6, 5.61
See application file for complete search history.

(56) References Cited

U.S. PATENT DOCUMENTS

| | | | |
|---|---|---|---|
| 9,672,675 B1* | 6/2017 | Nishiyama | G07C 9/00309 |
| 11,553,303 B2* | 1/2023 | Hasegawa | H04W 4/40 |
| 11,762,101 B2* | 9/2023 | Hasegawa | H04L 67/04 |
| | | | 342/357.52 |
| 11,792,602 B2* | 10/2023 | Hasegawa | B60R 25/403 |
| | | | 455/456.1 |
| 12,024,125 B2* | 7/2024 | Kono | H04W 4/48 |
| 12,212,077 B2* | 1/2025 | Pirch | G07C 9/00309 |
| 12,339,346 B2* | 6/2025 | Han | B60R 25/24 |

(Continued)

FOREIGN PATENT DOCUMENTS

JP 2021-096135 A 6/2021

*Primary Examiner* — Nam V Nguyen
(74) *Attorney, Agent, or Firm* — Rankin, Hill & Clark LLP

(57) ABSTRACT

A mobile body control device that includes a mobile terminal position measurement unit configured to: communication between a first communication unit and a mobile terminal is intermittently performed, to start mobile terminal position measurement processing for measuring the position of the mobile terminal based on a communication state between the first communication unit and the mobile terminal; and, when the position of the mobile terminal measured by the mobile terminal position measurement processing does not reach a second prescribed distance or less from a mobile body within a prescribed time from a point of start of the mobile terminal position measurement processing, the switching period is changed to a second measurement period that is longer than the first measurement period and the mobile terminal position measurement processing is continued.

5 Claims, 4 Drawing Sheets

(56) References Cited

U.S. PATENT DOCUMENTS

| | | | | |
|---|---|---|---|---|
| 12,409,810 | B2* | 9/2025 | Zhang | B60R 25/24 |
| 2018/0099643 | A1* | 4/2018 | Golsch | G01S 13/765 |
| 2018/0162321 | A1* | 6/2018 | Spiess | G07C 9/00309 |
| 2020/0084625 | A1* | 3/2020 | Kosugi | H04W 12/033 |
| 2020/0363524 | A1* | 11/2020 | Yoon | H04W 12/069 |
| 2021/0179022 | A1 | 6/2021 | Hasegawa et al. | |

\* cited by examiner

MOBILE BODY CONTROL DEVICE, MOBILE BODY CONTROL METHOD, AND RECORDING MEDIUM

INCORPORATION BY REFERENCE

The present application claims priority under 35 U.S.C. § 119 to Japanese Patent Application No. 2023-034488 filed on Mar. 7, 2023. The content of the application is incorporated herein by reference in its entirety.

BACKGROUND OF THE INVENTION

Field of the Invention

The present invention relates to a mobile body control device, a mobile body control method, and a recording medium.

Description of the Related Art

Recently, in order to ensure that more people can have access to reasonable, reliable, sustainable, and advanced energies, there have been researches and developments conducted in regard to charging and supplying power in a mobile body with a secondary battery loaded thereon for contributing to improving energy efficiency.

For example, there is a proposed technique that allows a user to use a vehicle with a battery loaded thereon by communicating with a mobile terminal used by the user to authenticate the mobile terminal approaching the vehicle (for example, see Japanese Patent Laid-Open No. 2021-96135). In the technique described in Japanese Patent Laid-Open No. 2021-96135, when a mobile terminal approaching an area within a prescribed distance from the vehicle is detected by communication via BLE (Bluetooth Low Energy; Bluetooth is a registered trademark) that requires low power consumption and has a wide communication range, detection of the position by UWB (Ultra-Wide Band) communication exhibiting high position detection accuracy is started.

Then, when the position of the mobile terminal measured by the communication via UWB moves away from the vehicle, when there is no change in the position of the mobile terminal, and when the remaining battery charge is low, the measurement of the position through the UWB communication is ended or the intervals for measuring the position is expanded, to suppress the power consumed by the execution of the UWB communication.

By the way, like the technique described in Japanese Patent Laid-Open No. 2021-96135 as a technique regarding charging and supplying power in a mobile body having a secondary battery loaded thereon, if the measurement of the position through communication is ended or intervals for measuring the position is expanded by communication, in a case of recognizing the user of the mobile body via the communication, authentication of the mobile terminal thereafter cannot be performed promptly, thereby deteriorating the convenience for the user when using a vehicle. It is therefore an object of the present application to reduce the power consumption associated with the communication while suppressing the deterioration in the convenience for the user when using a vehicle, in a case where the position of a mobile terminal with respect to a mobile body is measured through communication with the mobile terminal.

In order to overcome the foregoing issue, the present application is designed to reduce the power consumption when the position of the mobile terminal with respect to the mobile body is measured through communication with the mobile terminal while suppressing the deterioration in the convenience for the user. This consequently contributes to improving the energy efficiency.

SUMMARY OF THE INVENTION

A first aspect for achieving the foregoing object is a mobile body control device that includes: a first communication control unit configured to control communication between a first communication unit and a mobile terminal, the first communication unit being provided to a mobile body and performing communication by a first communication specification, the mobile terminal being used by a user of the mobile body; a second communication control unit configured to control communication between a second communication unit and the mobile terminal, the second communication unit being provided to the mobile body and performing communication in a communication range within a first prescribed distance from the mobile body by a second communication specification with lower power consumption compared to the first communication specification; and a mobile terminal position measurement unit configured to: when communication between the second communication unit and the mobile terminal is established under control of the second communication control unit, the first communication unit is switched between an operating state and a suspended state at a switching period set in a first prescribed measurement period and communication between the first communication unit and the mobile terminal is intermittently performed under control of the first communication control unit, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

In the mobile body control device, when communication between the first communication unit and the mobile terminal is established under the control of the first communication control unit after changing the switching period from the first measurement period to the second measurement period, the mobile terminal position measurement unit may: end the mobile terminal position measurement processing; start electric field intensity measurement processing for measuring electric field intensity of the communication between the second communication unit and the mobile terminal performed under the control of the second communication control unit; and, when the electric field intensity measured by the electric field intensity measurement processing reaches a prescribed level or higher, restart the mobile terminal position measurement processing.

In the mobile body control device, the mobile terminal position measurement unit may set the switching period to a third measurement period that is shorter than the second measurement period, when the electric field intensity measured by the electric field intensity measurement processing reaches the prescribed level or higher and the mobile terminal position measurement processing is restarted.

A second aspect for achieving the foregoing object is a mobile body control method executed by a computer, and the mobile body control method includes: a first communication control step of controlling communication between a first communication unit and a mobile terminal, the first communication unit being provided to a mobile body and performing communication by a first communication specification, the mobile terminal being used by a user of the mobile body; a second communication control step of controlling communication between a second communication unit and the mobile terminal, the second communication unit being provided to the mobile body and performing communication in a communication range within a first prescribed distance from the mobile body by a second communication specification with lower power consumption compared to the first communication specification; and a mobile terminal position measurement step of: when communication between the second communication unit and the mobile terminal is established under control of the second communication control step, the first communication unit is switched between an operating state and a suspended state at a switching period set in a first prescribed measurement period and communication between the first communication unit and the mobile terminal is intermittently performed under control of the first communication control step, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

A third aspect for achieving the foregoing object is a non-transitory recording medium storing a program that causes a computer to function as: a first communication control unit configured to control communication between a first communication unit and a mobile terminal, the first communication unit being provided to a mobile body and performing communication by a first communication specification, the mobile terminal being used by a user of the mobile body; a second communication control unit configured to control communication between a second communication unit and the mobile terminal, the second communication unit being provided to the mobile body and performing communication in a communication range within a first prescribed distance from the mobile body by a second communication specification with lower power consumption compared to the first communication specification; and a mobile terminal position measurement unit configured to: when communication between the second communication unit and the mobile terminal is established under control of the second communication control unit, the first communication unit is switched between an operating state and a suspended state at a switching period set in a first prescribed measurement period and communication between the first communication unit and the mobile terminal is intermittently performed under control of the first communication control unit, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

According to the mobile body control device of the present disclosure, it is possible to reduce the power consumption associated with the communication while suppressing the deterioration in the convenience for the user when using a vehicle, in a case where the position of the mobile terminal with respect to the mobile body is measured by communicating with the mobile terminal.

DETAILED DESCRIPTION OF THE PREFERRED EMBODIMENTS

Figure 1:
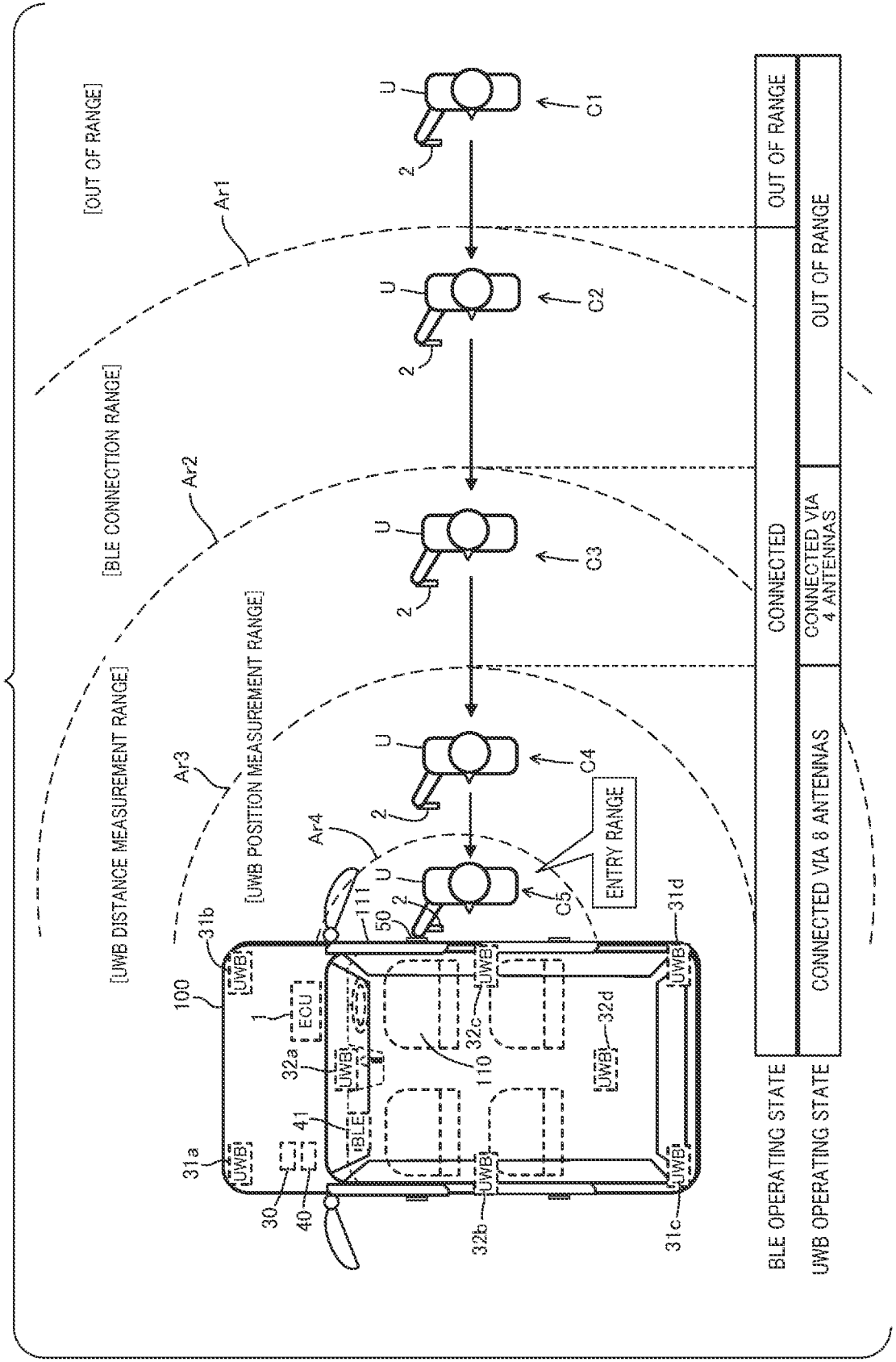
FIG. 1 is an explanatory diagram showing a mode when searching for a mobile terminal approaching a vehicle by using a mobile body control device.

1. Search for Mobile Terminal Approaching Vehicle

By referring to FIG. 1, outline of a mode that is executed by a mobile body control device 1 according to an embodiment when searching for a mobile terminal 2 carried by a user U who is approaching a vehicle 100 will be described. The mobile body control device 1 is configured as a function of an ECU (Electronic Control Unit) that is loaded on the vehicle 100 and controls operations of the vehicle 100.

An electronic key app (application) is installed in the mobile terminal 2, and the mobile terminal 2 functions as an electronic key including a remote control function of the vehicle 100 by executing the electronic key app. The mobile terminal 2 is a wearable device such as a smartphone, a mobile phone, a tablet terminal, or a smartwatch, for example, and it is used by being carried or worn by the user U.

The vehicle 100 and the mobile terminal 2 communicate with each other by communication specifications of BLE (Bluetooth Low Energy; Bluetooth is a registered trademark) and UWB (Ultra-Wide Band). The UWB communication specification corresponds to a first communication specification of the present disclosure, and the BLE communication specification corresponds to a second communication specification of the present disclosure. In the UWB communication, a band from 500 MHz to above 10 GHz (for example, around 8 GHz band) is used.

The vehicle 100 is provided with: a first communication unit 30 that carries out communication by UWB; UWB antennas 31a to 31d and 32a to 32d connected to the first communication unit 30; a second communication unit 40 that carries out communication by BLE; and a BLE antenna 41 connected to the second communication unit 40. The mobile body control device 1, the first communication unit 30, and the second communication unit 40 are operated by the power supplied from a battery provided in the vehicle 100.

The UWB antennas 31a to 31d are disposed at the four corners of the body of the vehicle 100, and the UWB antennas 32a to 32d are disposed in the interior of the vehicle 100. Furthermore, a handle 50 is provided at a driver's seat door 111, and operations of the handle 50 made by the user U are detected by a handle sensor 50a (see FIG. 2).

The mobile body control device 1 performs polling by BLE communication via the second communication unit 40 and, when the mobile terminal 2 enters an inner side (state of C2) from an outer side (state of C1) of a communication area Ar1 of the BLE communication performed by the second communication unit 40, BLE communication is established with the mobile terminal 2 within the communication area Ar1. The communication area Ar1 corresponds to a communication range within a first prescribed distance from the mobile body according to the present disclosure. The communicable range through the BLE communication is wider than that of the UWB communication, and the power consumed by the BLE communication is lower than that of the UWB communication. Therefore, as described, by performing polling through the BLE communication, it is possible to recognize the mobile terminal 2 that is approaching the vehicle 100 while suppressing the power consumption.

Then, the mobile body control device 1 performs authentication of the electronic key with the mobile terminal 2, and verifies that the mobile terminal 2 is registered as the electronic key of the vehicle 100. Specifically, the mobile body control device 1 collates an authentication code (terminal identification information of the mobile terminal 2) transmitted from the mobile terminal 2 with an authentication code saved in a memory of the mobile body control device 1 to verify that the mobile terminal 2 is registered as the electronic key of the vehicle 100.

Subsequently, the mobile body control device 1 starts the first communication unit 30 and activates the four UWB antennas 31a to 31d. When the mobile terminal 2 enters the inner side (state of C3) from the outer side (state of C2) of a communication area Ar2 that is a UWB distance measurement range, UWB communication is established between the first communication unit 30 and the mobile terminal 2.

The mobile body control device 1 measures the distance of the mobile terminal 2 from the vehicle 100 by the UWB communication and, upon recognizing that the mobile terminal 2 has entered the inner side (state of C4) from the outer side (state of C3) of a communication area Ar3 that is a UWB position measurement range, activates the UWB antennas 32a to 32d as well (in a state where all UWB antennas 31a to 31d and 32a to 32d are activated) to measure the position of the mobile terminal 2. Measurement of the distance and the position of the mobile terminal 2 by the UWB communication can be performed using a known method disclosed in Japanese Patent Laid-Open No. 2021-096134 or the like.

Note here that when the user U approaches the vehicle 100 further and operates the handle 50 of the driver's seat door 111, normally, the mobile body control device 1 determines that the user U uses a driver's seat 110, and performs processing such as setting the position of power seat equipment provided to the driver's seat 110 in accordance with a setting condition saved in the memory by corresponding to the authentication code of the mobile terminal 2.

However, there may also be a case where the user U approaching the vehicle 100 does not enter the vehicle 100 immediately and stays in the vicinity of the driver's seat door 111. Then, in such a case, continuing the UWB communication with the mobile terminal 2 increases the power consumed by the UWB communication. Therefore, the mobile body control device 1 switches an operating state and a suspended state of the first communication unit 30 at a prescribed switching period to execute processing for suppressing the power consumed by the UWB communication. Hereinafter, the configuration of the mobile body control device 1 that executes the UWB communication intermittently in this manner and measures the position of the mobile terminal 2 with respect to the vehicle 100 as well as the position measurement processing will be described.

2. Configuration of Mobile Body Control Device

By referring to FIG. 2, the configuration of the mobile body control device 1 will be described. To the mobile body control device 1, the first communication unit 30, the second communication unit 40, the handle sensor 50a, and the like described above are connected. The mobile body control device 1 is a control unit that includes a processor 10, a memory 20, and the like, and a program 21 for controlling the mobile body control device 1, user registered information 22, and the like are saved in the memory 20. The program 21 may be read out by the mobile body control device 1 from a recording medium (optical disk, flash memory, or the like) and saved in the memory 20 or may be downloaded by the mobile body control device 1 from an external server or the like, not shown, and saved in the memory 20.

The user registered information 22 contains the authentication code of the mobile terminal 2 used by the user U of the vehicle 100, and setting conditions of specific equipment of the vehicle 100 (conditions set by the user U) associated with the authentication code. When the vehicle 100 is shared by a plurality of users U, the authentication code and setting conditions for the specific equipment are individually saved for each of the users U.

The processor 10 functions as a first communication control unit 11, a second communication control unit 12, a mobile terminal position measurement unit 13, and a target identification information recognition unit 14 by reading and executing the program 21. The processing executed by the first communication control unit 11 corresponds to a first communication control step in the mobile body control method of the present disclosure, and the processing executed by the second communication control unit 12 corresponds to a second communication control step in the mobile body control method of the present disclosure. The processing executed by the mobile terminal position measurement unit 13 corresponds to a mobile terminal position measurement step in the mobile body control method of the present disclosure.

The first communication control unit 11 performs control of the UWB communication between the first communication unit 30 and the mobile terminal 2 described above. The second communication control unit 12 performs control of the BLE communication between the second communication unit 40 and the mobile terminal described above. The mobile terminal position measurement unit 13 measures the position of the mobile terminal 2 with respect to the vehicle 100 through performing the UWB communication under the control of the first communication control unit 11 and the BLE communication under the control of the second communication control unit 12. Details of the position measurement processing of the mobile terminal 2 performed by the mobile terminal position measurement unit 13 will be described later. The target identification information recognition unit 14, as described above, sets the seat position and the like of the driver's seat 110 according to the setting condition associated with the authentication code of the mobile terminal 2, when it is recognized by a detection signal of the handle sensor 50a that the handle 50 of the driver's seat door 111 is operated.

3. Mobile Terminal Position Measurement Processing

Figure 3:
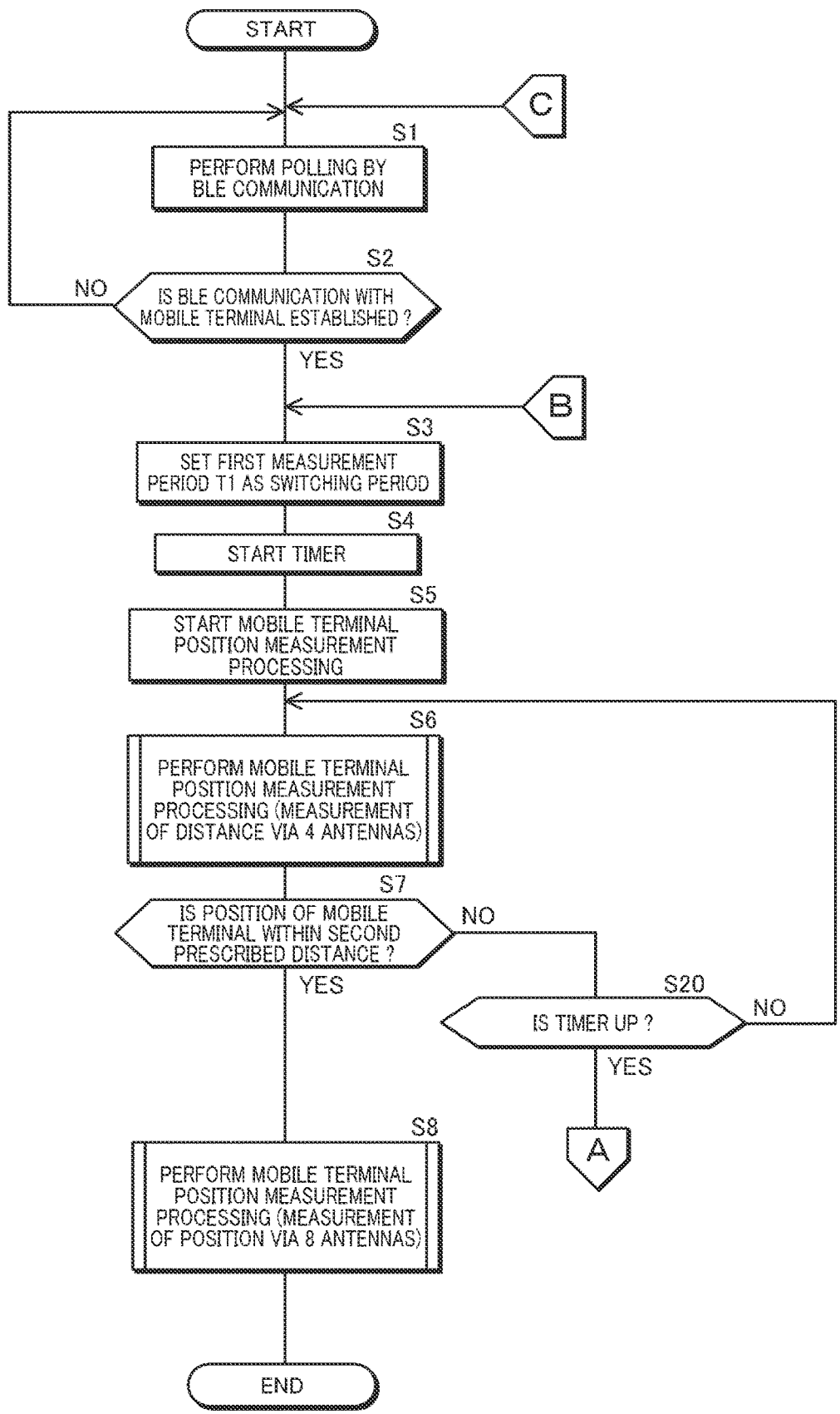
FIG. 3 is a first flowchart showing mobile terminal position measurement processing.

According to the flowcharts shown in FIG. 3 to FIG. 4, the position measurement processing of the mobile terminal 2 executed by the mobile body control device 1 will be described. Through Step S1 and Step S2 in FIG. 3, the mobile terminal position measurement unit 13 performs polling by the BLE communication under the control of the second communication control unit 12 in Step S1 and, when the BLE communication is established between the second communication unit 40 and the mobile terminal 2, advances the processing to Step S3.

In Step S3, the mobile terminal position measurement unit 13 sets the switching period for performing the UWB communication intermittently to a first measurement period T1 (for example, several hundreds of milliseconds). In next Step S4, in order to determine whether the mobile terminal 2 has approached a second prescribed distance (for example, several meters to several tens of meters) or less from the vehicle 100 within a prescribed time, the mobile terminal position measurement unit 13 starts a timer with the prescribed time being a setting time till the time is up.

In subsequent Step S5, the mobile terminal position measurement unit 13 switches the first communication unit 30 between the operating state and the suspended state at the switching period, and performs the UWB communication between the first communication unit 30 and the mobile terminal 2 intermittently under the control of the first communication control unit 11 to start the mobile terminal position measurement processing for measuring the position of the mobile terminal 2 with respect to the vehicle 100.

Through the loop processing of following Steps S6, S7, and S20, the mobile terminal position measurement unit 13 executes the mobile terminal position measurement processing in Step S6 until the timer runs out in Step S20, and determines in Step S7 whether the position of the mobile terminal 2 measured by the mobile terminal position measurement processing is within the second prescribed distance (for example, several meters) from the vehicle 100.

In the mobile terminal position measurement processing in Step S6, the mobile terminal position measurement unit 13 activates the four UWB antennas 31a to 31d, and performs the UWB communication between the first communication unit 30 and the mobile terminal 2 under the control of the first communication control unit 11 to measure the position of the mobile terminal 2. The mobile terminal position measurement unit 13 advances the processing to Step S8 when determined in Step S7 that the position of the mobile terminal 2 is within the second prescribed distance from the vehicle 100, and advances the processing to Step S20 when the position of the mobile terminal 2 exceeds the second prescribed distance from the vehicle 100.

In Step S8, the mobile terminal position measurement unit 13 activates all UWB antennas 31a to 31d and 32a to 32d, and performs the UWB communication between the first communication unit 30 and the mobile terminal 2 under the control of the first communication control unit 11 to measure the position of the mobile terminal 2 (state of C4 in FIG. 1). Thereby, the mobile terminal position measurement unit 13 measures the position of the mobile terminal 2 existing in the vicinity of the driver's seat 110 with high precision and, as described above, the target identification information recognition unit 14 recognizes the authentication code of the user U who uses the driver's seat 110.

Figure 4:
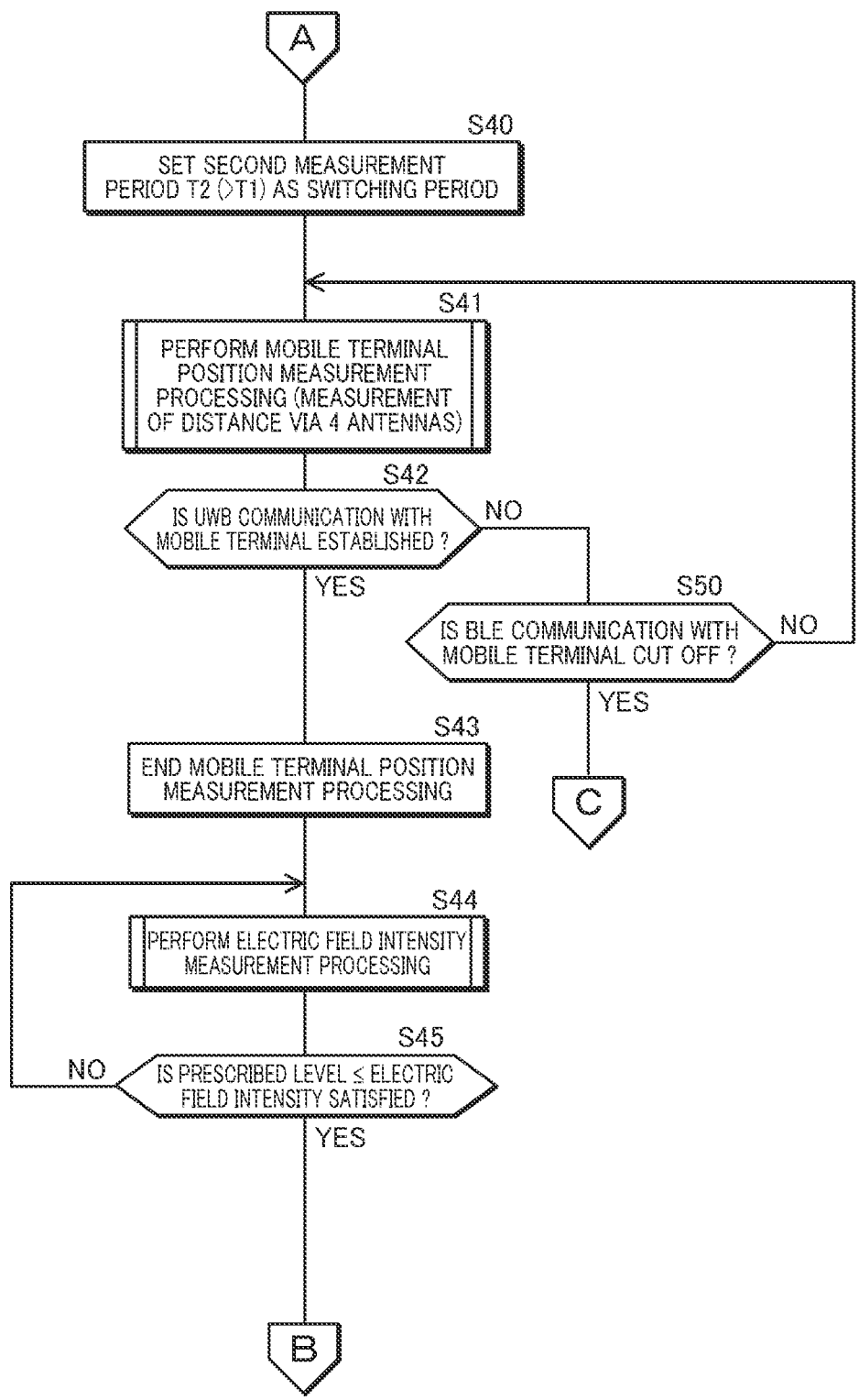
FIG. 4 is a second flowchart showing the mobile terminal position measurement processing.

When the timer runs out in Step S20, that is, when the distance of the mobile terminal 2 from the vehicle 100 measured by the mobile terminal position measurement processing does not come to be within the second prescribed distance from the vehicle 100 before the prescribed time passes, the mobile terminal position measurement unit 13 advances the processing to Step S40 in FIG. 4.

In Step S40, in the mobile terminal position measurement processing, the mobile terminal position measurement unit 13 changes the switching period for switching the first communication unit 30 between the operating state and the suspended state to a second measurement period T2 (>T1) that is longer than the first measurement period T1. The second measurement period T2 is set as several tens of seconds to several minutes, for example.

Through the loop processing of following Steps S41, S42, and S50, the mobile terminal position measurement unit 13 executes the mobile terminal position measurement processing in Step S41 until it is determined in Step S50 that the BLE communication between the mobile terminal 2 and the second communication unit 40 is cut off (until the user U carrying the mobile terminal 2 moves away from the vehicle 100), and determines in Step S42 whether the UWB communication between the mobile terminal 2 and the first communication unit 30 is established.

In the mobile terminal position measurement processing in Step S41, the mobile terminal position measurement unit 13 activates the four UWB antennas 31a to 31d, and performs the UWB communication between the first communication unit 30 and the mobile terminal 2 under the control of the first communication control unit 11 to measure the position of the mobile terminal 2. Since the switching period for switching the first communication unit 30 between the operating state and the suspended state is changed to the second measurement period T2 that is longer than the first measurement period T1 in the mobile terminal position measurement processing in Step S41, it is possible to reduce the power consumed by the UWB communication in the mobile terminal position measurement processing.

When determined in Step S42 that the UWB communication between the mobile terminal 2 and the first communication unit 30 is established, the mobile terminal position measurement unit 13 advances the processing to Step S43 and ends the mobile terminal position measurement processing. In subsequent Step S44, the mobile terminal position measurement unit 13 executes electric field intensity measurement processing for measuring the electric field intensity of the BLE communication between the mobile terminal 2 and the second communication unit 40 based on the reception level of the radio waves from the mobile terminal 2 received by the second communication unit 40.

The level of the electric field intensity of the BLE communication between the mobile terminal 2 and the second communication unit 40 increases as the distance between the mobile terminal 2 and the vehicle 100 becomes shorter, so that the proximity degree of the mobile terminal 2 with respect to the vehicle 100 can be recognized based on the level of the electric field intensity. Then, since the power consumed by the BLE communication is lower than that of the UWB communication, it is possible to suppress the power consumed for detecting approaching of the mobile terminal 2 to the vehicle 100 through communication with the mobile terminal 2. When determined in Step S45 that the level of the electric field intensity measured by the electric field intensity measurement processing is a prescribed level or more, the mobile terminal position measurement unit 13 advances the processing to Step S3 in FIG. 3, and the mobile terminal position measurement processing is thereby restarted in Step S5.

When the processing is advanced from Step S45 to Step S3, the switching period is returned in Step S3 from the second measurement period T2 set in Step S40 to the first measurement period T. The first measurement period T1 in this case corresponds to a third measurement period of the present disclosure. This makes it possible to improve the responsiveness of the measurement of the position of the mobile terminal 2 performed by the mobile terminal position measurement processing restarted in Step S5 and to promptly measure the position of the mobile terminal 2. It is also possible to advance the processing from Step S45 to Step S3 in FIG. 3, and set the switching period when restarting the mobile terminal position measurement processing to a period that is shorter than the second measurement period T2 and different from the first measurement period T1.

4. Another Embodiment

In the embodiment described above, in Steps S42 to S45 in FIG. 4, the electric field intensity of the BLE communication between the mobile terminal 2 and the second communication unit 40 is measured to perform the processing for detecting the approaching of the mobile terminal 2 to the vehicle 100. However, this processing may be omitted.

While the vehicle 100 is discussed as the mobile body of the present disclosure in the embodiment described above, the mobile body of the present disclosure may simply need to be a mobile body that detects the approaching of the mobile terminal used by the user of the mobile body by communicating with the mobile terminal, such as an aircraft, a vessel, or the like.

While the first communication unit 30 that recognizes the position of the mobile terminal 2 with respect to the vehicle 100 by the UWB communication and the second communication unit 40 that recognizes the position of the mobile terminal 2 with respect to the vehicle 100 by the BLE communication are discussed in the embodiment described above, the position of the mobile terminal 2 with respect to the vehicle 100 may also be recognized by other communication specifications.

Figure 2:
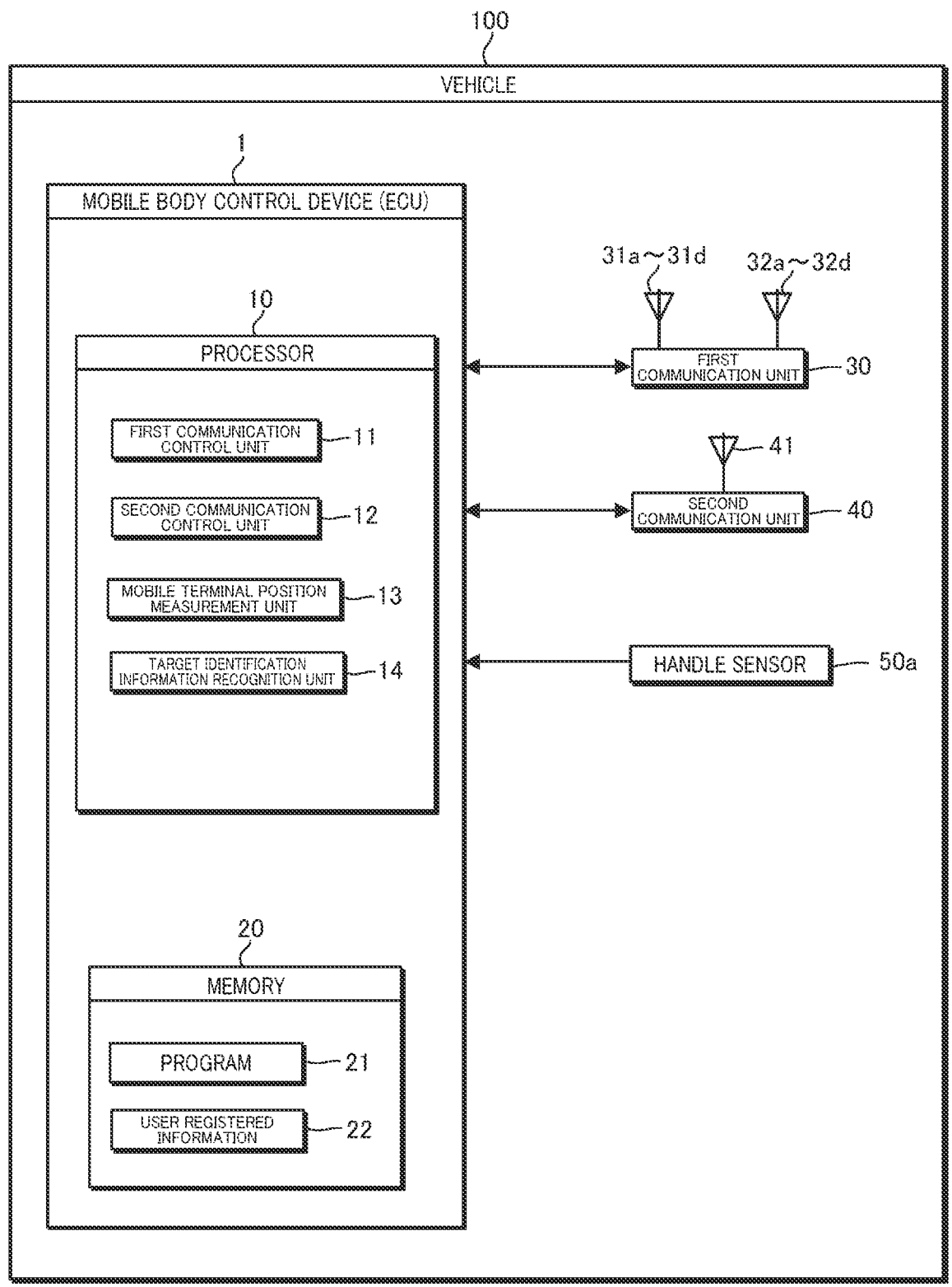
FIG. 2 is a configuration diagram of the mobile body control device.

Note that FIG. 1 and FIG. 2 are schematic diagrams which, in order to facilitate the understanding of the invention of the present disclosure, show the configuration of the mobile body control device 1 divided according to the main processing contents. However, the configuration of the mobile body control device 1 may be divided according to other criteria. Furthermore, the processing of each of the structural elements may be executed by a single hardware unit or may be executed by a plurality of hardware units. Moreover, the processing by each of the structural elements shown in FIG. 3 and FIG. 4 may be executed by a single program or may be executed by a plurality of programs.

5. Configuration Supported by the Embodiments

The above-described embodiments are specific examples of the following items.

(Item 1) A mobile body control device including: a first communication control unit configured to control communication between a first communication unit and a mobile terminal, the first communication unit being provided to a mobile body and performing communication by a first communication specification, the mobile terminal being used by a user of the mobile body; a second communication control unit configured to control communication between a second communication unit and the mobile terminal, the second communication unit being provided to the mobile body and performing communication in a communication range within a first prescribed distance from the mobile body by a second communication specification with lower power consumption compared to the first communication specification; and a mobile terminal position measurement unit configured to: when communication between the second communication unit and the mobile terminal is established under control of the second communication control unit, the first communication unit is switched between an operating state and a suspended state at a switching period set in a first prescribed measurement period and communication between the first communication unit and the mobile terminal is intermittently performed under control of the first communication control unit, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

According to the mobile body control device of item 1, when the user carrying the mobile terminal approaches the mobile body and communication between the second communication unit and the mobile terminal is established to start the mobile terminal position measurement processing for intermittently performing communication between the first communication unit and the mobile terminal, but the position of the mobile terminal does not reach the second prescribed distance or less from the mobile body before the prescribed time passes, the mobile terminal position measurement unit changes the switching period for operating the first communication unit to the second measurement period that is longer than the first measurement period. Thereby, when the mobile terminal position measurement processing is continued to measure the position of the mobile terminal with respect to the mobile body, it is possible to reduce the power consumption associated with the communication while suppressing deterioration in the convenience when the user uses the vehicle.

(Item 2) The mobile body control device according to item 1, in which, when communication between the first communication unit and the mobile terminal is established under the control of the first communication control unit after changing the switching period from the first measurement period to the second measurement period, the mobile terminal position measurement unit: ends the mobile terminal position measurement processing; starts electric field intensity measurement processing for measuring electric field intensity of the communication between the second communication unit and the mobile terminal performed under the control of the second communication control unit;

and, when the electric field intensity measured by the electric field intensity measurement processing reaches a prescribed level or higher, restarts the mobile terminal position measurement processing.

According to the mobile body control device of item 2, when it is recognized by the mobile terminal position measurement processing that the communication between the first communication unit and the mobile terminal is established and the mobile terminal is in the vicinity of the mobile body, it is possible to reduce the power consumed by the communication performed when recognizing the approaching of the mobile terminal by ending the mobile terminal position measurement processing that requires the communication by the first communication unit with higher power consumption, and starting the electric field intensity measurement processing for measuring the electric field intensity of the communication performed by the second communication unit with lower power consumption to monitor the approaching of the mobile terminal to the mobile body based on the electric field intensity.

(Item 3) The mobile body control device according to item 2, in which the mobile terminal position measurement unit sets the switching period to a third measurement period that is shorter than the second measurement period, when the electric field intensity measured by the electric field intensity measurement processing reaches the prescribed level or higher and the mobile terminal position measurement processing is restarted.

According to the mobile body control device of item 3, when it is determined that the mobile terminal is in the vicinity of the mobile body based on the increase in the electric field intensity measured by the electric field intensity measurement processing, the processing such as authentication of the mobile terminal can be executed promptly by improving the responsiveness of the measurement of the position of the mobile terminal through shortening the switching period for switching the second communication unit from the suspended state to the operating state in the mobile terminal position measurement processing.

(Item 4) A mobile body control method executed by a computer, the mobile body control method including: a first communication control step of controlling communication between a first communication unit and a mobile terminal, the first communication unit being provided to a mobile body and performing communication by a first communication specification, the mobile terminal being used by a user of the mobile body; a second communication control step of controlling communication between a second communication unit and the mobile terminal, the second communication unit being provided to the mobile body and performing communication in a communication range within a first prescribed distance from the mobile body by a second communication specification with lower power consumption compared to the first communication specification; and a mobile terminal position measurement step of: when communication between the second communication unit and the mobile terminal is established under control of the second communication control step, the first communication unit is switched between an operating state and a suspended state at a switching period set in a first prescribed measurement period and communication between the first communication unit and the mobile terminal is intermittently performed under control of the first communication control step, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

By executing the mobile body control method of item 4 using the computer, it is possible to acquire the same effects as those of the mobile body control device of item 1.

(Item 5) A non-transitory recording medium storing a program that causes a computer to function as: a first communication control unit configured to control communication between a first communication unit and a mobile terminal, the first communication unit being provided to a mobile body and performing communication by a first communication specification, the mobile terminal being used by a user of the mobile body; a second communication control unit configured to control communication between a second communication unit and the mobile terminal, the second communication unit being provided to the mobile body and performing communication in a communication range within a first prescribed distance from the mobile body by a second communication specification with lower power consumption compared to the first communication specification; and a mobile terminal position measurement unit configured to: when communication between the second communication unit and the mobile terminal is established under control of the second communication control unit, the first communication unit is switched between an operating state and a suspended state at a switching period set in a first prescribed measurement period and communication between the first communication unit and the mobile terminal is intermittently performed under control of the first communication control unit, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

By causing the computer to execute the program of item 5, it is possible to implement the configuration of the mobile body control device of item 1.

REFERENCE SIGNS LIST

1 Mobile body control device
2 Mobile terminal
10 Processor
11 First communication control unit
12 Second communication control unit
13 Mobile terminal position measurement unit
14 target identification information recognition unit
20 Memory
21 Program
22 User registered information
30 First communication unit
31a to 31d, 32a to 32d UWB antenna 40 Second communication unit
41 BLE antenna
50 Handle
50a Handle sensor
100 Vehicle (mobile body)
110 Driver's seat
111 Driver's seat door
U User

What is claimed is:

1. A mobile body control device comprising:
a first communication control unit configured to control communication between a first communication unit and a mobile terminal, the first communication unit being provided to a mobile body and performing communication by a first communication specification, the mobile terminal being used by a user of the mobile body;
a second communication control unit configured to control communication between a second communication unit and the mobile terminal, the second communication unit being provided to the mobile body and performing communication in a communication range within a first prescribed distance from the mobile body by a second communication specification with lower power consumption compared to the first communication specification; and
a mobile terminal position measurement unit configured to: when communication between the second communication unit and the mobile terminal is established under control of the second communication control unit, the first communication unit is switched between an operating state and a suspended state at a switching period set in a first prescribed measurement period and communication between the first communication unit and the mobile terminal is intermittently performed under control of the first communication control unit, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

2. The mobile body control device according to claim 1, wherein, when communication between the first communication unit and the mobile terminal is established under the control of the first communication control unit after changing the switching period from the first measurement period to the second measurement period, the mobile terminal position measurement unit: ends the mobile terminal position measurement processing; starts electric field intensity measurement processing for measuring electric field intensity of the communication between the second communication unit and the mobile terminal performed under the control of the second communication control unit; and, when the electric field intensity measured by the electric field intensity measurement processing reaches a prescribed level or higher, restarts the mobile terminal position measurement processing.

3. The mobile body control device according to claim 2, wherein the mobile terminal position measurement unit sets the switching period to a third measurement period that is shorter than the second measurement period, when the electric field intensity measured by the electric field intensity measurement processing reaches the prescribed level or higher and the mobile terminal position measurement processing is restarted.

4. A mobile body control method executed by a computer, the mobile body control method comprising:
a first communication control step of controlling communication between a first communication unit and a mobile terminal, the first communication unit being provided to a mobile body and performing communication by a first communication specification, the mobile terminal being used by a user of the mobile body;
a second communication control step of controlling communication between a second communication unit and the mobile terminal, the second communication unit being provided to the mobile body and performing communication in a communication range within a first prescribed distance from the mobile body by a second communication specification with lower power consumption compared to the first communication specification; and
a mobile terminal position measurement step of: when communication between the second communication unit and the mobile terminal is established under control of the second communication control step, the first communication unit is switched between an operating state and a suspended state at a switching period set in a first prescribed measurement period and communication between the first communication unit and the mobile terminal is intermittently performed under control of the first communication control step, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

5. A non-transitory recording medium storing a program that causes a computer to function as:
a first communication control unit configured to control communication between a first communication unit and a mobile terminal, the first communication unit being provided to a mobile body and performing communication by a first communication specification, the mobile terminal being used by a user of the mobile body;
a second communication control unit configured to control communication between a second communication unit and the mobile terminal, the second communication unit being provided to the mobile body and performing communication in a communication range within a first prescribed distance from the mobile body by a second communication specification with lower power consumption compared to the first communication specification; and a mobile terminal position measurement unit configured to: when communication between the second communication unit and the mobile terminal is established under control of the second communication control unit, the first communication unit is switched between an operating state and a suspended state at a switching period set in a first prescribed measurement period and communication between the first communication unit and the mobile terminal is intermittently performed under control of the first communication control unit, to start mobile terminal position measurement processing for measuring a position of the mobile terminal with respect to the mobile body based on a communication state between the first communication unit and the mobile terminal; and, when the position of the mobile terminal measured by the mobile terminal position measurement processing does not reach a second prescribed distance or less from the mobile body within a prescribed time from a point of start of the mobile terminal position measurement processing, the switching period is changed to a second measurement period that is longer than the first measurement period and the mobile terminal position measurement processing is continued.

* * * * *